United States Patent
Zhong et al.

(10) Patent No.: US 9,240,219 B2
(45) Date of Patent: Jan. 19, 2016

(54) HARD DISK SUPPORT AND ELECTRONIC DEVICE USING THE HARD DISK SUPPORT

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Xiang-Kun Zhong, Shenzhen (CN); Hsien-Huan Chiu, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/600,199

(22) Filed: Jan. 20, 2015

(65) Prior Publication Data

US 2015/0206554 A1 Jul. 23, 2015

(30) Foreign Application Priority Data

Jan. 23, 2014 (CN) .......................... 2014 1 0032514

(51) Int. Cl.
*G11B 33/08* (2006.01)
*G06F 1/18* (2006.01)
*G11B 33/12* (2006.01)

(52) U.S. Cl.
CPC ................ *G11B 33/08* (2013.01); *G06F 1/187* (2013.01); *G11B 33/124* (2013.01)

(58) Field of Classification Search
CPC .... G11B 33/08; G11B 33/124; G11B 25/043; G11B 23/0327; G11B 33/122; G11B 33/146; G11B 33/1466
USPC ........................................................ 360/98.01
See application file for complete search history.

(56) References Cited

U.S. PATENT DOCUMENTS

| | | | | |
|---|---|---|---|---|
| 5,216,582 | A * | 6/1993 | Russell et al. | 361/679.34 |
| 6,477,042 | B1 * | 11/2002 | Allgeyer et al. | 361/679.34 |
| 6,798,651 | B2 * | 9/2004 | Syring et al. | 361/679.34 |
| 7,031,150 | B2 * | 4/2006 | Chen et al. | 361/679.33 |
| 7,440,274 | B2 * | 10/2008 | Bruner et al. | 361/679.33 |
| 7,515,407 | B2 * | 4/2009 | Goodman et al. | 361/679.34 |
| 8,035,916 | B2 * | 10/2011 | Marlow et al. | 360/97.19 |
| 8,908,327 | B1 * | 12/2014 | Li | 360/99.17 |

FOREIGN PATENT DOCUMENTS

| | | |
|---|---|---|
| CN | 201597634 U | 10/2010 |
| CN | 202120615 U | 1/2012 |
| CN | 202694234 U | 1/2013 |

* cited by examiner

*Primary Examiner* — Mark Blouin
(74) *Attorney, Agent, or Firm* — Novak Druce Connolly Bove + Quigg LLP

(57) ABSTRACT

A hard disk support for holding a hard disk drive can include a frame, a bracket, and a plurality of arched ribs. The bracket is located in the frame. The plurality of arched ribs extends from the frame toward to the bracket, and the arched ribs couple the bracket to the frame. When the hard disk support is shaken at a first orientation, the arched ribs are deformed to reduce the shock to the bracket to relieve the shock to the hard disk drive. As a result, the hard disk drive can be secured on the hard disk support without shock absorbers to absorb shock.

20 Claims, 4 Drawing Sheets

HARD DISK SUPPORT AND ELECTRONIC DEVICE USING THE HARD DISK SUPPORT

FIELD

The subject matter herein generally relates to electronic devices, and more particularly to an electronic device with a hard disk support.

BACKGROUND

Hard disk drives are generally used to store data in a notebook or a computer. The notebook or the computer can include a hard disk support to secure the hard disk drive. The hard disk drive can receive shock when the hard disk support is moved, and the data in the hard disk drive can work abnormally and even be damaged under the shock. In general, the hard disk drive is fixed on the hard disk support by screws, and the hard disk support comprises a plurality of shock absorbers to absorb shock. However, the assembly of the shock absorbers with the hard disk support increases cost and labor.

BRIEF DESCRIPTION OF THE DRAWINGS

Implementations of the present technology will now be described, by way of example only, with reference to the attached figures, wherein.

DETAILED DESCRIPTION

Figure 1:
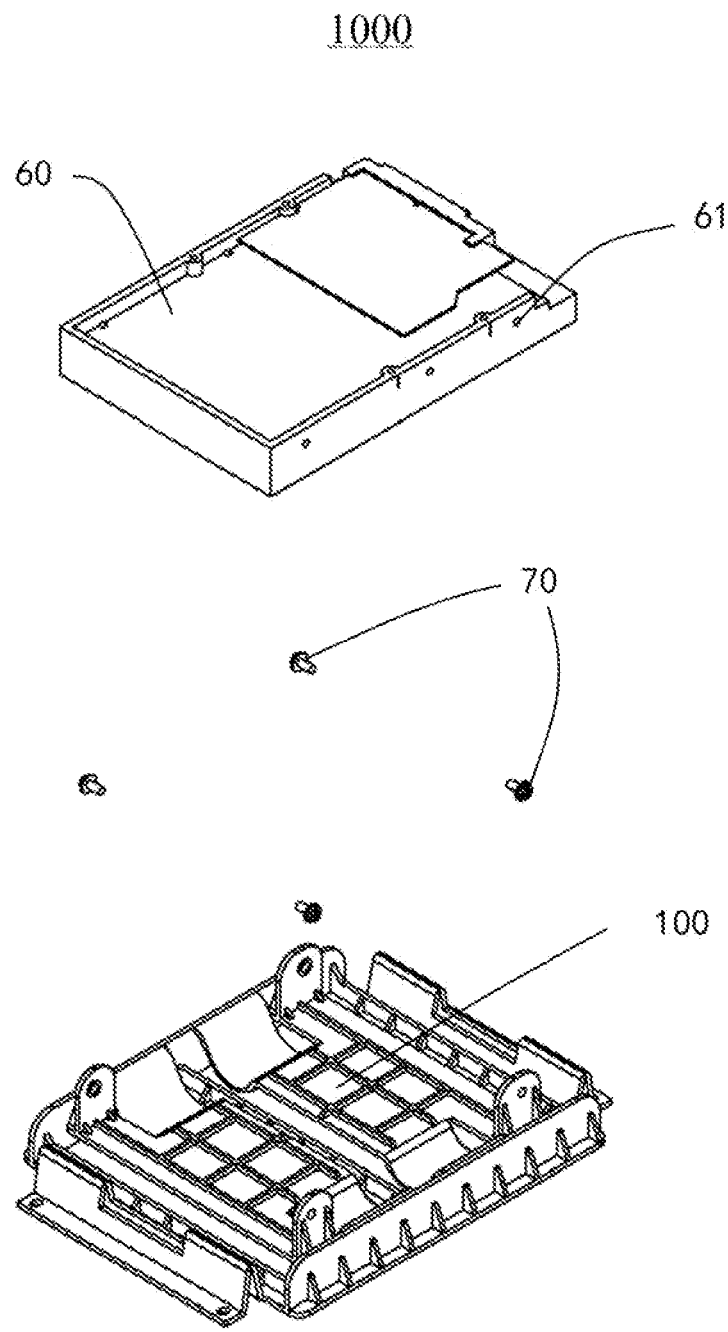
FIG. 1 is an exploded view of an electronic device, the electronic device includes a hard disk drive and a hard disk support.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "comprising," when utilized, means "including, but not necessarily limited to"; it specifically indicates open-ended inclusion or membership in the so-described combination, group, series and the like.

The present disclosure is described in relation to an electronic device with a hard disk support.

FIG. 1 illustrates a first embodiment of an electronic device 1000. The electronic device 1000 includes a hard disk drive 60, a hard disk support 100 supporting the hard disk drive 60, and a plurality of fasteners 70 coupled the hard disk drive 60 to the hard disk support 100. The hard disk drive 60 includes a plurality of through holes 61 to secure the hard disk support 100 by the fasteners 70. In the illustrated embodiment, the fasteners 70 can be screws.

Figure 2:
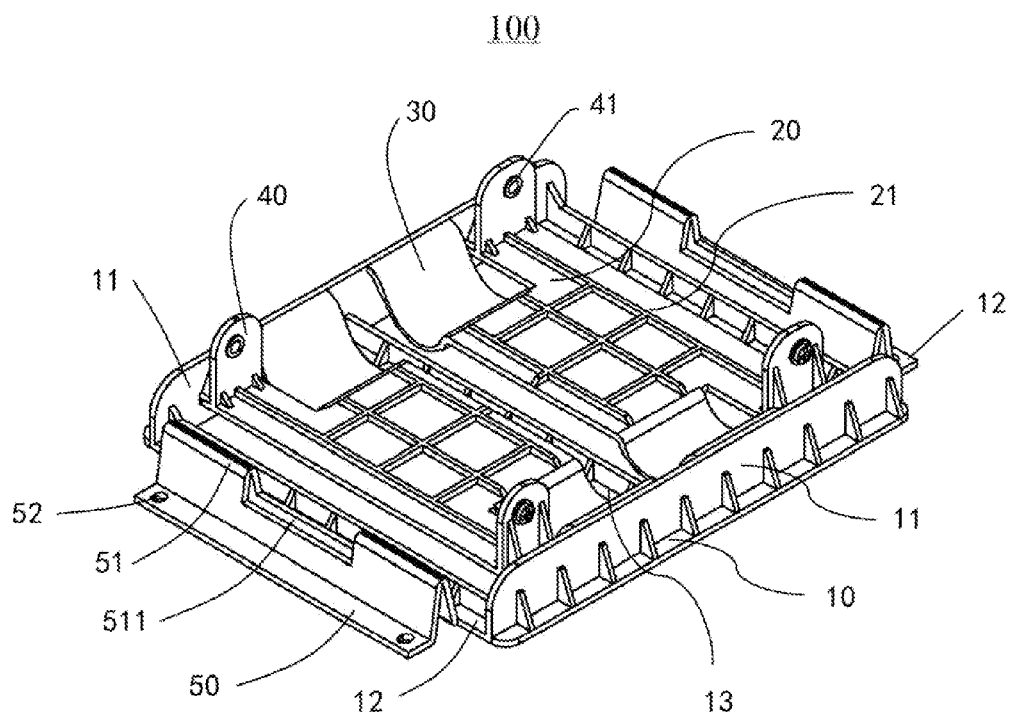
FIG. 2 is a first isometric view of the hard disk support.
Figure 2:
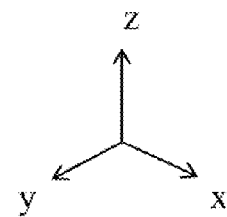

FIGS. 1 and 2 illustrate that the hard disk support 100 includes a frame 10, a bracket 20, and a plurality of arched ribs 30 extending downwardly from the frame 100. The bracket 20 is located in the frame 10 and coupled with the frame 10 by the arched ribs 30.

The frame 10 is rectangular and defines a hollow rectangular space 13. The frame 10 includes a pair of first panels 11 opposite to each other and a pair of second panels 12 vertical to the first panels 11. The pair of first panels 11 couples with the pair of second panels 12 end to end, and the pair of the first panels 11 and the pair of second panels 12 form the rectangular space 13. The bracket 20 extends from a bottom of the first panels 11 and includes a plurality of supporting ribs 21 for supporting the hard disk drive 60. One end of the arched rib 30 is coupled to the first panel 11, and the other end of the arched rib 30 is coupled to the bracket 20. In other words, the bracket 20 is located between the two arched ribs 30. The arched ribs 30 are resilient.

In the illustrated embodiment, the number of the brackets 20 is two; correspondingly, the number of the arched ribs 30 is four. In other embodiments, the number of the brackets 20 can be one, three, four, or any other number. The number of the arched ribs 30 can be two, six, eight, or any other number corresponding to the number of brackets.

Figure 3:
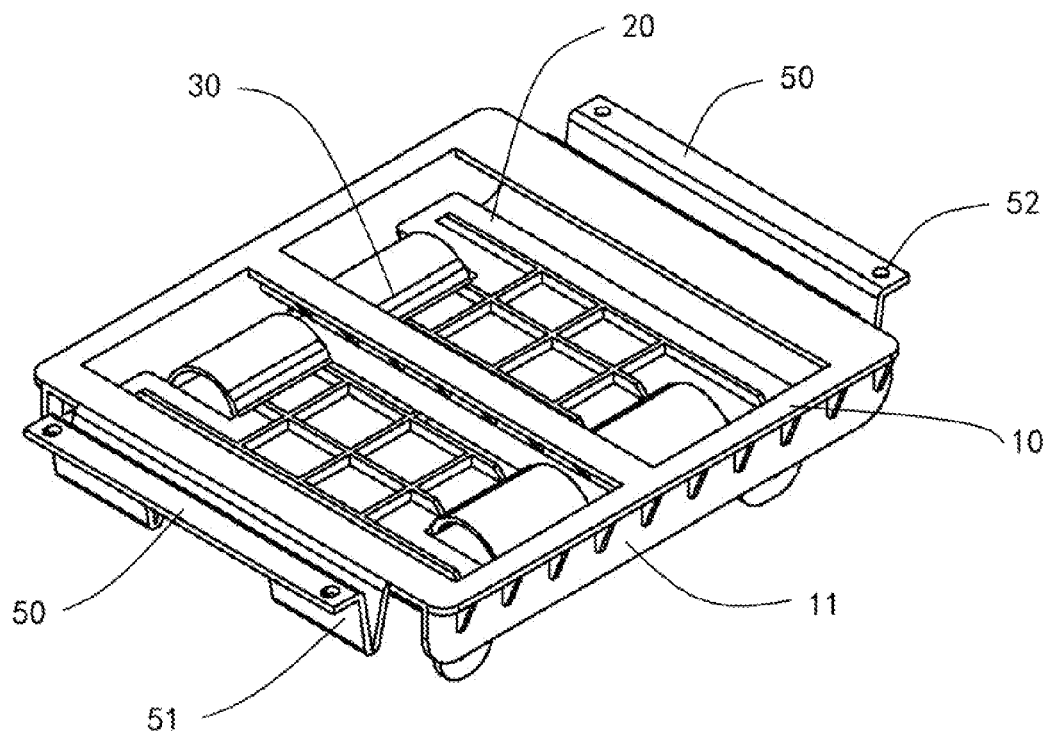
FIG. 3 is an isometric view of the hard disk support of FIG. 2 viewed from bottom.
Figure 4:
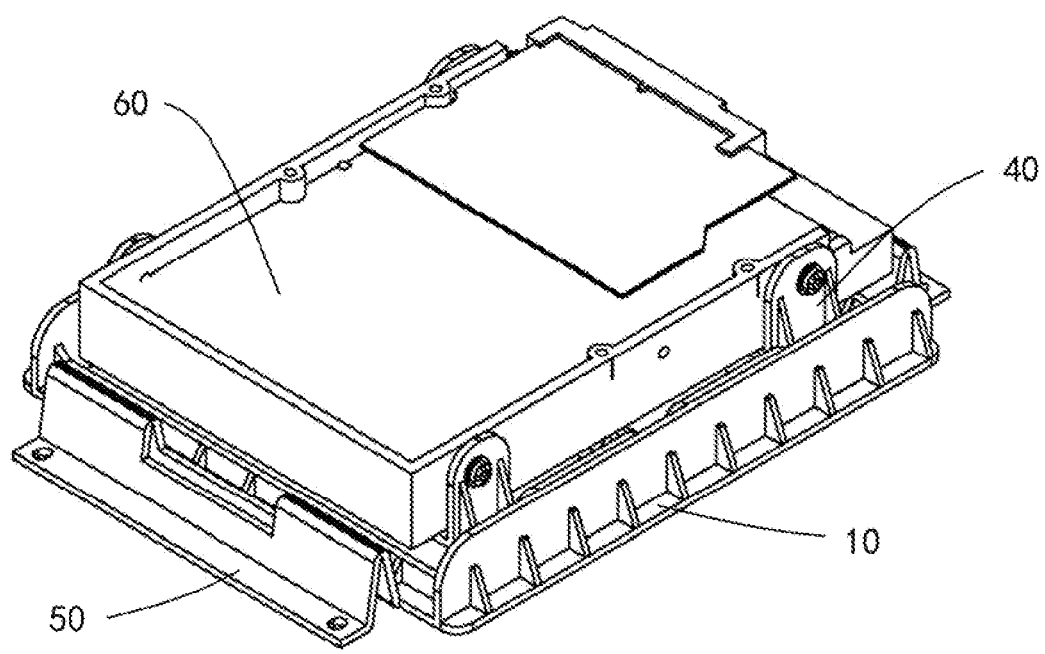
FIG. 4 is an isometric view of the hard disk drive assembled to the hard disk support of FIG. 1.

FIGS. 3 and 4 illustrate that the hard disk support 100 further includes a plurality of positioning portions 40 secured on an inner surface of the first panels 11 corresponding to the arched ribs 30, and a pair of fixing portions 50 located on an outside surface of the second panels 12. Each of the positioning portions 40 includes a plurality of positioning holes 41 used for fixing to the hard disk drive 60. In the illustrated embodiment, the number of the positioning portions 40 is four.

The fixing portion 50 extends away from a corresponding second panel 12 of the frame 10 and forms a bent arm 51 between the fixing portion 50 and the corresponding second panel 12. The bent arm 51 is a "V" shape and made of resilient materials to relieve the shock to the hard disk drive 60. An opening 511 is defined in a middle of the bent arm 51 configured to hold the hard disk drive 60 in the hard disk support 10. The fixing portion 50 includes a plurality of fixing holes 52 used for fixing the hard disk support 100 on other devices. The other devices can be a set-top box, a router, or a computer.

In the illustrated embodiment, the frame 10, the brackets 20, the arched arms 30, the positioning portions 40, and the fixing portions 50 are integrated. The material of the hard disk support 100 is plastic.

When the electronic device 1000 is in assembly, the supporting ribs 21 support the hard disk drive 60. The through holes 61 are aimed at the positioning holes 41 of the positioning portion 40, and the fasteners pass through the positioning holes 41 and the through holes 61 to secure the hard disk drive 60 on the hard disk support 100.

FIG. 2 illustrates when the hard disk support 100 receives a shock in orientation of X or Z, the arched ribs 30 can be deformed to reduce the shock to the bracket 20, accordingly, the deformation of the arched ribs 30 relieves the shock to the hard disk drive 60 and protects the hard disk drive 60 from damaging in the direction of X or Z. When the hard disk support 100 is shanken in direction of Y, the bent arms 51 between the second panel 12 of the frame 10 and the fixing portion 50 can be deformed to reduce the shock to the frame 10, accordingly, the deformation of the arched ribs 30 relieves the shock to the hard disk drive 60 and protects the hard disk drive 60 from being damaged in direction of Y.

The embodiments shown and described above are only examples. Many details are often found in the art such as the other features of an electronic device with a hard disk support. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A hard disk support for holding a hard disk drive comprising:
   a frame defining a hollow rectangular space and comprising a pair of first panels opposite to one another;
   a bracket extending from one of first panels to the other first panel and located on a bottom of the frame to cover the rectangular space; and
   a plurality of arched ribs downwardly curved extending from one of the first panels towards the bracket and the other first panel, the plurality of arched ribs coupling the bracket to the frame;
   wherein when the hard disk drive is fixed on the frame, the bracket and the arched ribs support the hard disk drive, and when the hard disk support is shaken at a first orientation, the arched ribs are configured to deform to reduce a shock of the bracket affecting to the hard disk drive.

2. The hard disk support of claim 1, wherein the frame comprises a pair of second panels perpendicular to the first panels, the pair of first panels couple with the pair of second panels end to end, and the pair of the first panels and the pair of second panels cooperatively form the rectangular space.

3. The hard disk support of claim 2, wherein one end of one arched rib is coupled to the first panels, and the other end of the one arched rib is coupled to the bracket.

4. The hard disk support of claim 3, wherein the arched ribs are made of resilient materials.

5. The hard disk support of claim 3, wherein the number of the brackets is two and the number of the arched ribs is four, and the brackets comprises a plurality of supporting ribs for supporting the hard disk drive.

6. The hard disk support of claim 2, further comprising a plurality of positioning portions secured on an inner surface of the first panels corresponding to the arched ribs, and a pair of fixing portions located on an outside of the second panels.

7. The hard disk support of claim 6, wherein each of the positioning portion defines a plurality of positioning holes used for fixing to the hard disk drive.

8. The hard disk support of claim 6, wherein the fixing portion extends away from a corresponding second panel of the frame and forms a bent arm between the fixing portion and the corresponding second panel.

9. The hard disk support of claim 8, wherein the bent arm is a V shape and made of resilient materials to relieve the shock of the frame when the hard disk support is shaken at a second orientation different from the first orientation.

10. The hard disk support of claim 9, wherein an opening is defined in a middle of the bent arm to be convenient to put a hard disk in the hard disk support.

11. The hard disk support of claim 6, wherein the frame, the brackets, the arched arms, the positioning portions, and the fixing portions are integrated.

12. An electronic device, comprising:
    a hard disk drive; and
    a hard disk support for holding a hard disk drive comprising:
      a frame defining a hollow rectangular space and comprising a pair of first panels opposite to one another;
      a bracket located on a bottom of the frame to cover the rectangular space and extending from one of first panels to the other first panel to support for the hard disk drive; and
      a plurality of arched ribs downwardly curved extending from one of the first panels towards the bracket and the other first panel, the plurality of arched ribs coupled the bracket to the frame;
    wherein when the hard disk drive is fixed on the frame, the bracket and the arched ribs support the hard disk drive, and when the hard disk support is shaken at a first orientation, the arched ribs are configured to deform to reduce a shock of the bracket affecting to the hard disk drive.

13. The electronic device of claim 12, wherein the frame comprises a pair of second panels perpendicular to the first panels, the pair of first panels couples with the pair of second panels end to end, and the pair of the first panels and the pair of second panels form the rectangular space.

14. The electronic device of claim 13, wherein one end of one arched rib is coupled to the first panels, the other end of the one arched rib is coupled to the bracket, and the brackets comprises a plurality of supporting ribs for supporting the hard disk drive.

15. The electronic device of claim 13, the hard disk support further comprising a plurality of positioning portions secured on an inner surface of the first panels corresponding to the arched ribs, and a pair of fixing portions located on an outside of the second panels.

16. The electronic device of claim 15, wherein each of the positioning portion includes a plurality of positioning holes used for fixation to the hard disk drive.

17. The electronic device of claim 15, wherein the fixing portion extends away from a corresponding second panel of the frame and forms a bent arm between the fixing portion and the corresponding second panel.

18. The electronic device of claim 17, wherein the bent arm is a V shape and made of resilient materials to relieve the shock of the frame when the hard disk support is shaken at a second orientation different from the first orientation.

19. The electronic device of claim 18, wherein an opening is defined in a middle of the bent arm to be convenient to put the hard disk drive in the hard disk support.

20. The electronic device of claim 15, wherein the frame, the brackets, the arched arms, the positioning portions, and the fixing portions are integrated.

* * * * *